United States Patent [19]

Kruse

[11] Patent Number: 5,005,865
[45] Date of Patent: Apr. 9, 1991

[54] SEATBELT POSITIONING ASSEMBLY FOR A PREGNANT PERSON

[76] Inventor: Steinar Kruse, Ste. 109, 1055 S. American Way, Miami, Fla. 33132

[21] Appl. No.: 560,882

[22] Filed: Jul. 31, 1990

[51] Int. Cl.⁵ ............................................. B60R 22/02
[52] U.S. Cl. .................................. 280/801; 297/464; 297/467; 297/468
[58] Field of Search ................. 180/271; 280/801, 808; 297/464, 465, 467, 468, 482

[56] References Cited

U.S. PATENT DOCUMENTS

| | | | |
|---|---|---|---|
| 4,402,548 | 9/1983 | Mason | 297/464 |
| 4,610,463 | 9/1986 | Efrom | 297/464 |
| 4,834,460 | 5/1989 | Herwig | 297/467 |

FOREIGN PATENT DOCUMENTS 3519346 12/1986 Fed. Rep. of Germany ...... 280/801

Primary Examiner—Charles A. Marmor
Assistant Examiner—Tamara L. Finlay
Attorney, Agent, or Firm—Malloy, Downey & Malloy

[57] ABSTRACT

A seatbelt positioning assembly for positioning a seatbelt of an automobile along the lower abdominal region of a pregnant person so as to avoid crossing over the womb. The seatbelt positioning assembly comprises a seat pad adapted to be positioned on the seat of the automobile being secured thereto by a securing strap fastened about the seat back portion. A sleeve is removably fitted along a portion of the length of the seatbelt wherein a pair of positioning straps connected to and extending from the seat pad are adapted for attachment with a bottom edge of the sleeve so as to pull the sleeve and, accordingly, the attached seatbelt downwardly in position along the lower abdominal region of the user.

7 Claims, 2 Drawing Sheets

SEATBELT POSITIONING ASSEMBLY FOR A PREGNANT PERSON

BACKGROUND OF THE INVENTION

1. Field of the Invention

A seatbelt positioning assembly for positioning a seatbelt in a preferred position along the lower abdominal region of a pregnant person so as to avoid the womb.

2. Description of the Prior Art

Most modern day automobiles include a seatbelt apparatus which includes a lower seatbelt designed to extend across the abdomen of the user. Additionally, most modern day seatbelt apparatus include a shoulder harness connected to an end of the seatbelt and adapted to extend across the user's upper body over one shoulder so as to limit forward movement in the event of a collision. With the seatbelt apparatus in its attached secured position, the shoulder harness tends to pull the seatbelt upwardly such that the seatbelt tends to ride up across the user's stomach.

When using the commonly known seatbelt apparatus, a pregnant person normally encounters the problem of the belt riding up so as to cross a lower portion of the womb. This creates an extremely dangerous condition in that a sudden jerk caused by impact of the automobile with another object results in the seatbelt squeezing or tightening about the womb. This may result in injury to the infant as well as the mother. Additionally, the constant strain of the seatbelt across the womb, in normal use, causes severe discomfort to the user.

There have been numerous attempts in the prior art to design a seatbelt apparatus specifically designed for use by a pregnant person so as to avoid exerting a sudden force on the womb in the event of an accident. Most of these seatbelt assemblies in the prior art are rather complex and are designed to replace the existing seatbelt apparatus in the car, thereby becoming a permanent installation. Additionally, many of the seatbelt assemblies for pregnant persons existing in the prior art are extremely cumbersome and require a great deal of effort to secure the assembly in a fastened position about the user's body.

Accordingly, there exists a need in the present seatbelt art for a seatbelt positioning assembly for a pregnant person adapted to be used in combination with an existing seatbelt apparatus as commonly found in present day automobiles, wherein the positioning assembly is specifically designed to position and orient the seatbelt along a lower abdominal region of the pregnant person in such a manner as to avoid contact across the womb. Additionally, there is a need in the present art for a seatbelt positioning assembly for use by pregnant people which is easy to fasten and unfasten allowing the user to quickly and efficiently enter and exit the automobile in every day use.

SUMMARY OF THE INVENTION

The present invention is directed towards a seatbelt positioning assembly for use in combination with an existing seatbelt apparatus being adapted to position the seatbelt along a lower abdominal region of a pregnant user so as to avoid undesirable contact with the womb area.

Specifically, the seatbelt positioning assembly of the present invention includes a seat pad adapted to be placed on the seat of the automobile and secured thereto by a securing strap connected to the seat pad and fastened about a lower portion of the seat back. A sleeve portion is structured so as to be slidably received along a portion of the length of the seatbelt, being fixedly positioned in a predetermined location along the belt. A pair of positioning straps connected to the seat pad and extending upwardly therefrom are attachable to a bottom edge of the sleeve portion in such a manner as to pull the sleeve portion downwardly in position over the hypogastric area of the lower abdominal region of the user. In this position, the sleeve directs the seatbelt in such a manner as to extend across the lower abdominal region of the user thereby avoiding contact with the womb area.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE DRAWINGS

Figure 1:
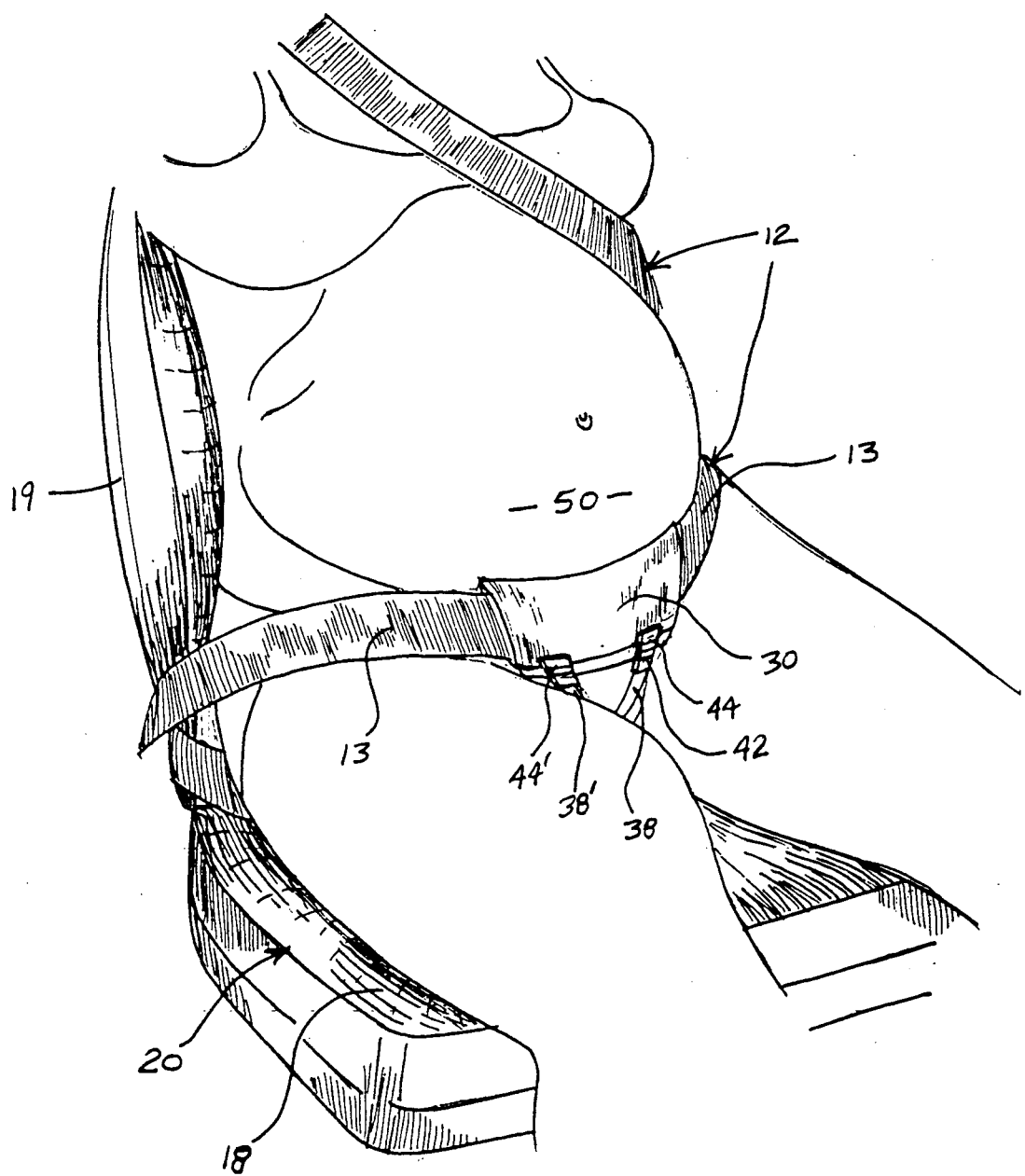
FIG. 1 is a perspective view of the seatbelt positioning assembly of the present invention shown in use in connection with a seatbelt apparatus fastened about a user.
Figure 2:
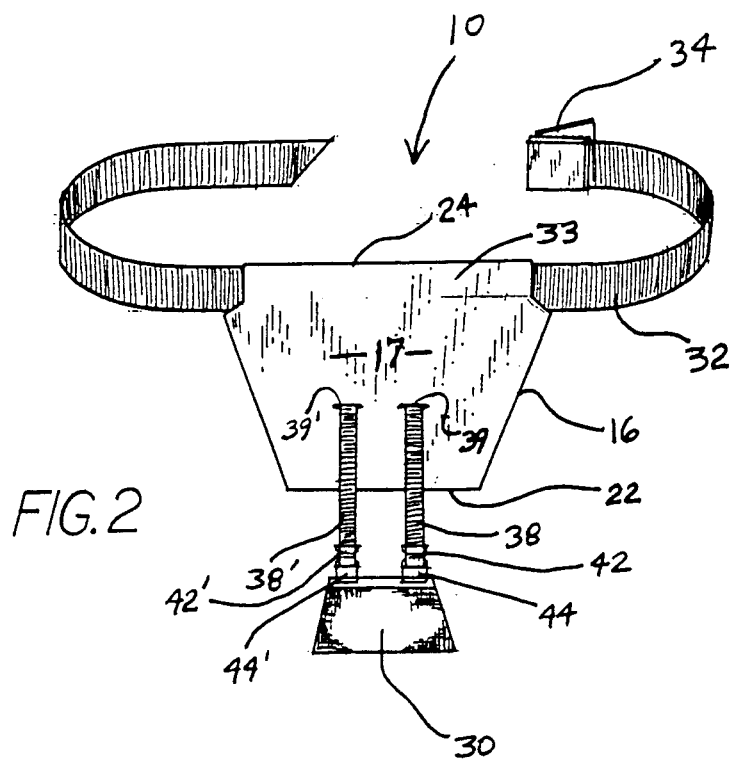
FIG. 2 is a top plan view of the seatbelt positioning assembly of the present invention.
Figure 3:
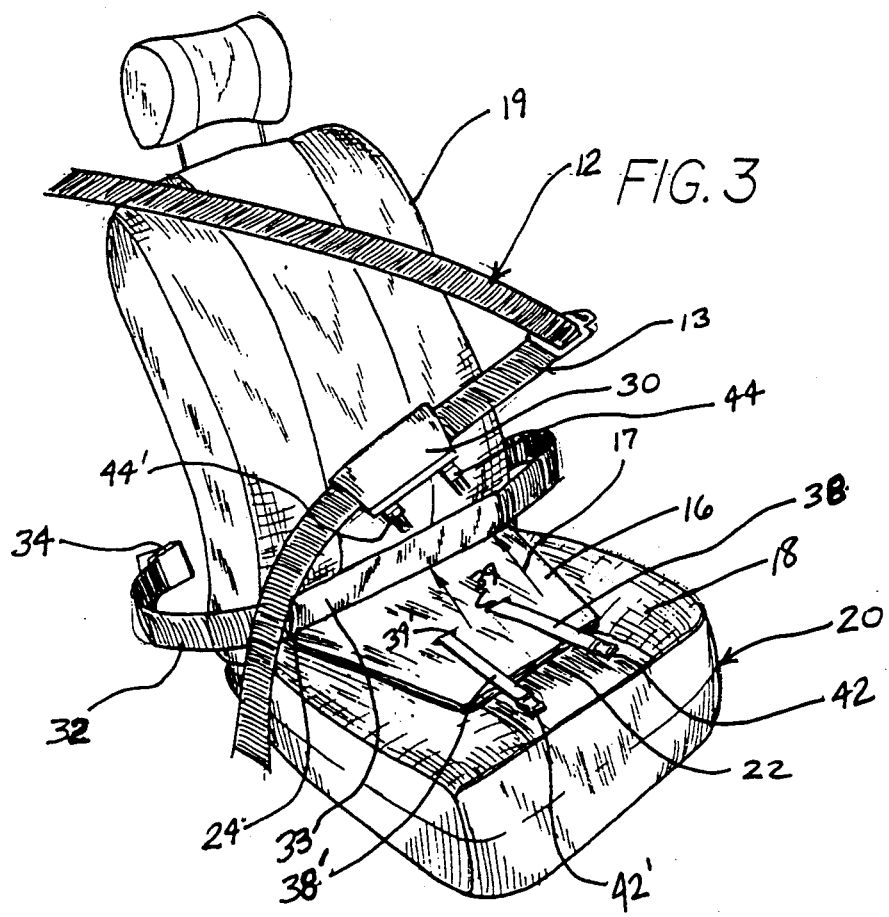
FIG. 3 is a perspective view of the seatbelt positioning assembly shown in combination with a seatbelt apparatus and an automobile seat.

As shown in FIGS. 1 through 3, the present invention is directed towards a seatbelt positioning assembly 10 for use in combination with a seatbelt apparatus 12 of an automobile. Referring to FIGS. 2 and 3, the seatbelt apparatus 10 includes a seat pad 16 adapted to be placed on a lower seat portion 18 of a car seat 20. The seat pad 16 includes an upper exposed side 17 oriented on the lower seat portion 18 so as to be positioned beneath the user's buttocks when seated in the car seat 20. The seat pad 16 further includes a front edge 22 extending in parallel relation to the front edge of the lower portion 18 of the car seat 20, and a rear edge 24 positionable in the crevice between the lower seat portion 18 and a upwardly extending back portion 19 of the car seat 20. A sleeve 30 is structured so as to be slidably fitted over the seatbelt 13 of the seatbelt apparatus 12. The sleeve 30 is positionable at a predetermined location along the length of the seatbelt 13 so as to normally engage with the hypogastric area of the lower abdominal region of the user, as illustrated in FIG. 1.

An elongate securing strap 32 is fitted through a tubular pocket 33 formed along the rear edge of the seat pad 16. The securing strap includes a fastening buckle 34 attached to one of two opposite ends for fastening the opposite ends of the securing strap about a lower portion of the back portion 19 of the car seat 20, thereby securing the seat pad 16 in place on the lower seat portion 18.

A pair of positioning straps 38 and 38' are each connected at one end to the elongate securing strap 32 along a intermediate portion thereof and extend through an interior of the seat pad 16 exiting through slots 39 and 39' formed in the upper surface 17 of the seat pad 16. Attached at opposite free distal ends of each of the positioning straps 38 and 38' are a pair of female clasp portions 42 and 42' adapted for attachment to corresponding male clasp portions 44 and 44' attached on a bottom edge 45 of the sleeve 30, as illustrated in FIG. 2.

The positioning straps 38 and 38' are specifically structured and disposed so as to apply a downward pulling force to the sleeve 30 positioning the sleeve 30 over the hypogastric area of the lower abdominal region of the user when the seatbelt apparatus 12 is fastened about the user as shown in FIG. 1. In this manner, the seatbelt 13 extends across the lower abdominal region of the pregnant user so as to avoid extension across or contact with the womb area 50 as illustrated in FIG. 1.

Now that the invention has been described,
What is claimed is:

1. For use in combination with a seatbelt of an automobile, a seatbelt positioning assembly adapted to position the seatbelt along a lower abdominal region of a pregnant person, said assembly comprising:

a seat pad for placement on a seat of the automobile having a substantially flat configuration and including an upper side and a lower congruent side connected thereto along an outer peripheral edge including a front edge, a rear edge and two opposite side edges, a sleeve structured and configured to be slidably received along a portion of the length of the seatbelt, an elongate securing strap fitted along said rear edge of said seat pad and adapted to extend around the seat, attaching at opposite free ends so as to secure said seat pad to said seat, positioning straps connected to said elongate securing strap and extending from said upper side of said seat pad, and said positioning straps including attachment means formed on a free distal end thereof for removable attachment with a bottom edge of said sleeve, said positioning straps being positioned and disposed so as to exert a downward pulling force on said sleeve when attached thereto, thereby pulling the seatbelt down to a position extending along the lower abdominal region of the pregnant person substantially below the womb.

2. An assembly as in claim 1 wherein said seat pad is formed from a substantially cushioning material.

3. An assembly as in claim 2 wherein said sleeve includes a longitudinally extending aperture extending through said sleeve along an entire length thereof, said aperture being sized and configured to slidably receive the seatbelt therethrough with said sleeve being fixedly positionable at a predetermined location along the length of the seatbelt so as to normally engage with the lower abdominal region of the user when the seatbelt is fastened.

4. An assembly as in claim 3 wherein said attachment means includes a pair of male clasp portions fitted to and extending from said bottom edge of said sleeve, being structured for locking engagement with a corresponding pair of female clasp portions each being fitted on said free distal end of one of said positioning straps.

5. An assembly as in claim 4 wherein a pair of said positioning straps are connected at one end to said elongate securing strap along an intermediate portion thereof.

6. An assembly as in claim 5 wherein said elongate securing strap is fitted through a longitudinally extending tubular pocket formed on said rear edge of said seat pad.

7. An assembly as in claim 6 wherein said elongate securing strap further includes a fastening buckle on one end of said opposite ends for attaching said opposite ends in securing position about the seat.

* * * * *